No. 624,359. Patented May 2, 1899.
W. MAYO.
PHOTOGRAPHIC FINDER.
(Application filed Nov. 25, 1898.)
(No Model.)
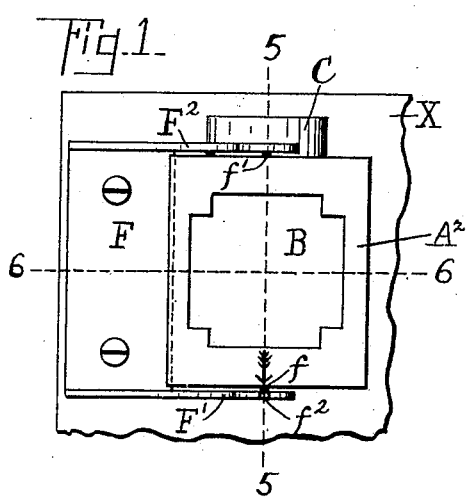
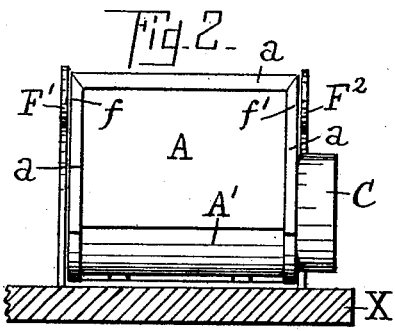
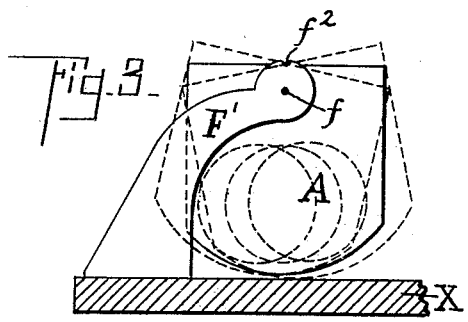
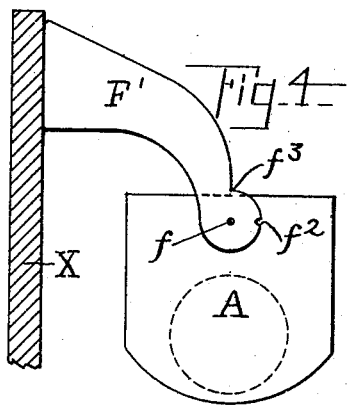
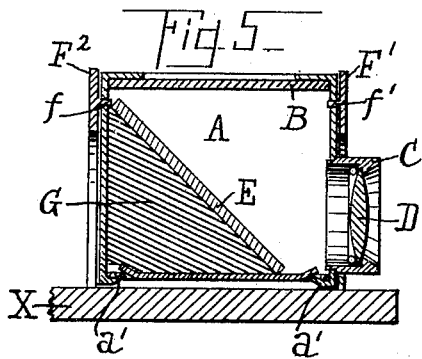
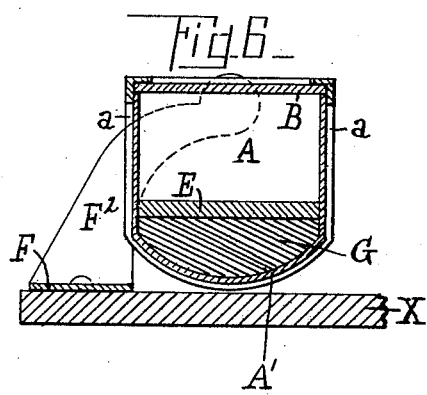
Witnesses.
A. R. Selden.
F. Bissell.
Inventor.
William Mayo
by Osgood & Davis
Attorneys.

UNITED STATES PATENT OFFICE.

WILLIAM MAYO, OF ROCHESTER, NEW YORK, ASSIGNOR TO EZRA R. ANDREWS, OF SAME PLACE.

PHOTOGRAPHIC FINDER.

SPECIFICATION forming part of Letters Patent No. 624,359, dated May 2, 1899.

Application filed November 25, 1898. Serial No. 697,398. (No model.)

*To all whom it may concern:*

Be it known that I, WILLIAM MAYO, a citizen of the United States, and a resident of Rochester, in the county of Monroe and State of New York, have invented certain new and useful Improvements in Camera-Finders, of which the following is a specification.

My invention relates to improvements in finders for photographic cameras; and the object of my invention is to provide a finder which will adjust itself for use when the camera is in position for either horizontal or vertical exposure.

Cameras intended for both horizontal and vertical exposure have heretofore been equipped either with two finders, one for use in connection with each exposure, or with a finder adapted to be set by the operator in proper position for use with either exposure. By my improvement I dispense with the necessity of equipping such a camera with two finders and provide one which is self-adjusting for use in case of either exposure. In addition to this advantage I combine in my finder a device for accurately leveling the camera.

In the drawings, Figure 1 is a top view of a finder embodying my invention attached to a camera in position for a horizontal exposure. Fig. 2 is a side elevation when the camera is in the same position. Fig. 3 is a front elevation when the camera is also in the same position. Fig. 4 is also a front elevation when the camera is in position for vertical exposure. Fig. 5 is a vertical longitudinal section on the line 5 5 of Fig. 1, and Fig. 6 is a vertical section on the line 6 6 of Fig. 1.

The finder is attached to the camera in the usual position.

A represents the finder-box, which is made of brass or other suitable material and whose top is cut away in the manner shown in Fig. 1, so as to expose the image-screen or ground glass B beneath it. In the front of the box the tube C is inserted in an aperture of suitable size, containing the lens D. Behind the lens and beneath the ground glass the reflecting-surface or mirror E is fixed at an angle of forty-five degrees to the plane of the said ground glass in any suitable manner, with its reflecting-surface uppermost, so as to reflect upon the said ground glass objects within the field of said lens.

The finder is pivotally supported between arms F' F², as upon the pins $f f'$, so as to be free to swing to and fro in the manner indicated by the dotted lines in Fig. 3. The arms F' F² are bent up from the plate F, and the latter is secured to the camera-box, a portion of which is shown in the drawings and indicated by the letter X. The arms F' F² are of equal length, so that the finder will swing in a plane at right angles to that side of the camera-box to which the finder is attached.

In respect to the self-adjusting feature I do not intend to limit my invention to a finder of the construction which I have shown and described, for many other forms of finders may be employed, nor do I limit myself to a support for the finder of the construction shown, for it will become apparent when I have described more fully the operation of my improved finder that the support is capable of various modifications which will support the finder in the same relative position as to the camera-box as that hereinbefore specified and are adapted for its self-adjustment.

In order that the finder may right itself and bring the ground glass into a horizontal position, it is pivotally supported above its center and may also be weighted, as by lead G or some other heavy substance placed within it beneath the mirror E. The bottom of the finder A' is concavely rounded to receive the weight, and the center of gravity of the finder is brought within its central vertical longitudinal plane and considerably below the pivoted axis. The finder will therefore always tend to assume the position in which the ground glass lies in a horizontal plane.

If the camera is to be used for a vertical exposure, it is evident that the finder will take the position shown in Fig. 4 when the camera is turned over.

It is obvious that it is not essential that the weight G should be placed within the finder in order that it shall assume a horizontal position as to the ground glass, for if pivoted above the center, as shown in the drawings, it must take that position. The weight acts to steady the finder and tends to bring it more readily and quickly to rest in the said position.

I claim also as new, and desire to secure by Letters Patent, the particular construction of the finder-box shown in the drawings. This finder-box is made from two pieces of metal, such as brass. One of said pieces $A'$ is bent so as to constitute the rounded bottom and the two sides of the said box, and the other piece $A^2$ is bent to form the top, front, and back of said box. The edges of said second piece $A^2$ are bent over at right angles in the manner represented by $a$ in Fig. 1, so that they lie against the piece $A'$ when the two are fitted together. A tongue $a'$, which projects from the edge $a$ on each side of the box, is forced into a socket $a^2$ in the bottom of the piece $A'$, thus locking said pieces firmly together and forming the box. Apertures are cut in the front of the box for the insertion of the tube containing the lens and in the top to expose the image-screen to view, as hereinbefore stated.

Other means for locking together the two pieces from which the finder is constructed may be employed without departing from my invention.

In order that the finder may operate as a level for the camera, I place a mark, such as the arrow shown in Fig. 1, upon the finder and a corresponding notch $f^2$ upon one of the arms, as $F'$, which is opposite the arrow when both the camera and finder are horizontal. When the camera is turned for exposure, as shown in Fig. 4, and both the camera and finder are horizontal, the point of the arrow is opposite to the angle $f^3$.

What I claim is—

1. In a camera-finder, a self-leveling finder-case, and means for supporting the same upon a camera, substantially as described.

2. The combination of a camera-finder, and a support for said finder, said support and said finder being movable with reference to each other and having indices, whereby the support may be leveled, substantially as described.

3. In a camera-finder, the combination of a finder-support, and a freely-swinging finder-case, pivoted to said support; said support and said finder having indices, whereby the camera is leveled substantially as described.

4. In a camera-finder, the combination of a finder-case, a support for said finder-case, consisting of the plate F, and the arms $F'$ and $F^2$; and pivots between said finder and said arms, substantially as described.

5. A finder-box, constructed of two pieces of sheet metal, one of said pieces being bent at each side of its latitudinal center to form three sides of said box, and having its edges bent inwardly at right angles; and the other of said pieces being bent on each side of its latitudinal center to form the other three sides of said box, and being adapted to lie behind the inwardly-turned edges of the other piece, one of said pieces having projecting tongues and the other having sockets adapted to receive said tongues, and one of said pieces having apertures for the image-screen and lens, substantially as described.

6. A finder-box, constructed of the piece $A^2$ having its edges $a$ bent at right angles, and having apertures for the image-screen and lens, and projecting tongues $a'$; and the piece $A'$ having the sockets $a^2$ adapted to receive said tongues, substantially as described.

WILLIAM MAYO.

Witnesses:
C. M. PERKINS,
F. BISSELL.